United States Patent
Saarinen et al.

(10) Patent No.: US 6,690,920 B2
(45) Date of Patent: Feb. 10, 2004

(54) DEVICE AND METHOD FOR MEASURING THE REQUESTED AND ALLOCATED RESOURCES IN TELECOMMUNICATIONS SYSTEM

(75) Inventors: Matti Saarinen, Tampere (FI); Seppo Isojarvi, Ylöjärvi (FI); Jari Tiitinen, Espoo (FI); Mikko Ohvo, Numminen (FI); Petri Aalto, Pirkkala (FI); Armi Mensio, Vantaa (FI); Markku Rantanen, Ääanekoski (FI)

(73) Assignee: Nokia Corporation, Espoo (FI)

( * ) Notice: Subject to any disclaimer, the term of this patent is extended or adjusted under 35 U.S.C. 154(b) by 47 days.

(21) Appl. No.: 10/037,349

(22) Filed: Oct. 25, 2001

(65) Prior Publication Data
US 2002/0082808 A1 Jun. 27, 2002

(51) Int. Cl.$^7$ .......................... H04B 17/60; H04B 1/38; H04M 1/00
(52) U.S. Cl. .................. 455/67.1; 455/560; 455/446
(58) Field of Search ................ 455/67.1, 560, 455/434, 435, 450–453, 464, 446, 447, 67.11, 435.1, 422–425; 370/347, 337, 321, 345, 348, 442, 443

(56) References Cited

U.S. PATENT DOCUMENTS

| | | | |
|---|---|---|---|
| 5,285,494 A | | 2/1994 | Sprecher et al. |
| 6,112,101 A | * | 8/2000 | Bhatia et al. ............... 455/512 |
| 6,275,695 B1 | * | 8/2001 | Obhan ........................ 455/423 |
| 6,282,197 B1 | * | 8/2001 | Takahashi et al. ....... 370/395.1 |
| 6,295,453 B1 | * | 9/2001 | Desgagne et al. .......... 455/448 |
| 6,377,817 B1 | * | 4/2002 | Hakaste et al. ............. 455/553 |
| 6,385,314 B1 | * | 5/2002 | Furuya ........................ 379/219 |
| 2002/0057667 A1 | * | 5/2002 | Hamalainen et al. ....... 370/347 |
| 2003/0045237 A1 | * | 3/2003 | Gardner et al. ............... 455/63 |

FOREIGN PATENT DOCUMENTS

WO   WO 97/12490   4/1997

* cited by examiner

Primary Examiner—Nay Maung
Assistant Examiner—Edan Orgad
(74) Attorney, Agent, or Firm—Squire, Sanders & Dempsey L.L.P.

(57) ABSTRACT

In the present invention, a measuring device is proposed for measuring system resources which are used by a communication connection in a telecommunication network, said device comprising: means for receiving a request of allocation of system resources to establish said connection, said request indicating a preferred level of said resources, examining means (1) for examining parameters (BCIE1) indicating said requested resources, allocating means (3) for allocating, on the basis of the examination by said examining means (1), available resources indicated by parameters (BCIE2) of the communication network to the communication connection, and comparing means (4) for comparing the level of the requested resources (BCIE1) and the level of the resources allocated by the communication network (BCIE2). Furthermore, a corresponding measuring method is proposed. Using the present invention allows a operator to obtain improved knowledge of system resources.

35 Claims, 4 Drawing Sheets

DEVICE AND METHOD FOR MEASURING THE REQUESTED AND ALLOCATED RESOURCES IN TELECOMMUNICATIONS SYSTEM

This application is a continuation of international application serial number PCT/EP99/03044, filed May 4, 1999.

FIELD OF THE INVENTION

The present invention relates to a device and a corresponding method for measuring system resources which are used for a communication connection by a user equipment. In particular, the present invention is directed to a device and a corresponding method for measuring and comparing the requested and used resources in telecommunication services.

BACKGROUND OF THE INVENTION

In recent years, the usage of mobile communication systems increases rapidly, not only for transmitting speech messages but also for transmitting data, e.g., facsimile data, video data or the like. Similar to voice communication, such data can be transmitted via circuit switched connections, which means that at least one line is occupied by the communication as long as the connection exists.

As to increase, for example, transfer speed and capacity of the existing mobile communication systems, such as a 2nd generation GSM system, several solutions are proposed. One of that is a so called high speed circuit switched data (HSCSD) solution.

Using such a HSCSD solution enables to use several time slots or channels for a single communication session. This allows to multiply the transfer rate according to the number of used channels. Advantageously, no far reaching modifications are required in the existing network structures. However, there are some new functions to be introduced in the user equipment and the network devices for combining and splitting the data into separate data streams which will then be transmitted via N full rate channels. This will be described below with reference to FIG. 2.

For establishing or modifying a communication connection in, e.g., a 2nd generation GSM public land mobile network (PLMN), there are required telecommunication services and an allocation or modifying of resources. Said services define the communication capabilities made available to users by the network. The operational and commercial features associated with the provision of the services are included in the service concept. Allocated resources are, for example, the number of used transfer channels, in particular in a data call.

The telecommunication services are divided in two categories. One of them includes transmission services, such as bearer services in GSM, which provide the capability of transmission of signals between users, independent of the form of content. In other words, they only refer to transport capabilities and not to information processing.

Figure 1:
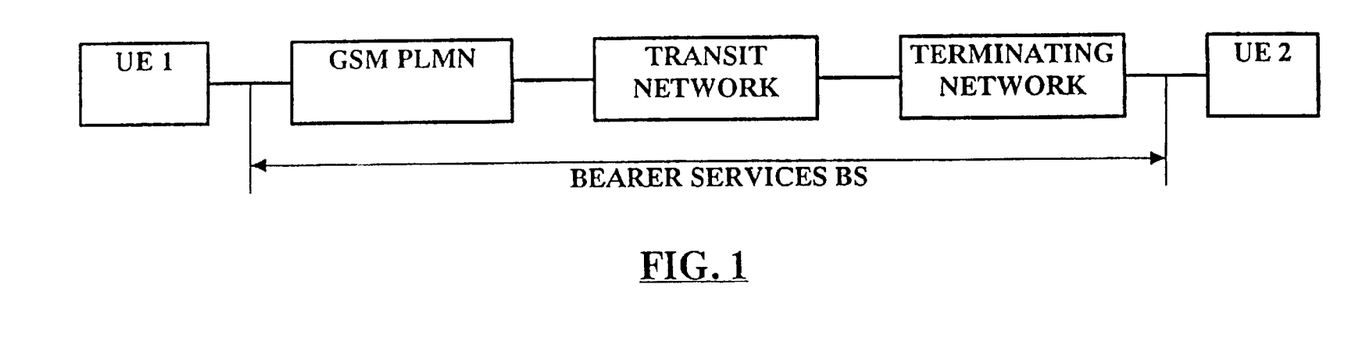
FIG. 1 is a schematic view of parts used in a communication connection between two user equipments.

The transmission or bearer services provide the user with the possibility of gaining access to various forms of communication, for example information transfer between a user in a GSM PLMN and a user in a terminating network, including the same GSM PLMN, another GSM PLMN and other types of communication networks like a integrated service digital network (ISDN), via a (possible) transit network, as shown in FIG. 1.

The bearer services are described by a bearer capability information element (BCIE) described later with reference to FIG. 5, which parameters define the technical features of a bearer service. The bearer capability information element comprises for example information transfer, access and interworking attributes.

In case of a conventional speech call, when a mobile station or user equipment calls, for example, another user equipment in the same or in another communication network, first a call setup has to be performed. For this purpose, bearer services are to be requested by, e.g., the user equipment from the communication network via sending a BCIE, thereby defining which connection parameters and resources are required by the user equipment for said communication session. These parameters are checked by the network, e.g., in the mobile services switching center, and corresponding parameters and resources (at an equal level or at least at the highest available, but lower level than requested) are allocated to the communication connection. Said allocated parameters are transmitted back via another BCIE to the requesting user equipment which then decides whether to accept these parameters for performing the call or not. Therefore, it is sufficient for the network operator to identify, whether the allocated bearer services were used or not.

In case of a data call, the procedure is similar. However, there is a difference, especially for calls in a HSCSD communication session mentioned above. Although there are also bearer services and resources requested by the user equipment and allocated by the network, it is possible, that bearer service parameters and resources are allocated at a lower level than requested. For example, the user equipment requests four channels to be allocated for the communication connection, but only three channels are available (which therefore only can be allocated). However, hitherto, no possibility exists to measure if the network resources were sufficient for the requested transmission services for the call. According to the above described speech call, the network operator is only adapted to recognize whether the bearer service are accepted. However, a possible service level difference can not be recognized.

In document WO 97/12490 A, a mobile communication system and a method for establishing a data call is described, wherein available resources are allocated to communication connections.

SUMMARY OF THE INVENTION

Consequently, it is an object of the present invention to provide a device for an improved measuring of system resources, e.g., radio and hardware resources, which are used for a communication connection, in particular for a data communication connection, and to provide a corresponding measuring method which provide improved information for a network operator.

According to the present invention, this object is achieved by a measuring device for measuring system resources which are used by a communication connection in a telecommunication network, said device comprising means for receiving a request of allocation of system resources to establish said connection, said request indicating a preferred level of said resources, examining means for examining parameters indicating said requested resources, and allocating means for allocating, on the basis of the examination by said examining means, available resources indicated by parameters of the telecommunication network to the communication connection, characterized by comparing means for comparing the level of the requested resources and the level of the resources allocated by the telecommunication network, determining means for determining, on the basis of the comparison by said comparing means, whether the level of the resources allocated by the telecommunication network is lower than the level of requested resources, and outputting means for outputting a result of the determination by said determining means, if it is determined, that a lower level is present.

Furthermore, the present invention provides A measuring method for measuring system resources which are used by a communication connection in a telecommunication network, said method comprising steps of requesting allocation of system resources to establish said connection, said request indicating a preferred level of said resources, examining parameters indicating said requested resources, and allocating, on the basis of said examining step, available resources indicated by parameters of the communication network to the communication connection, characterized by further comprising the steps of comparing the level of the requested resources and the level of the resources allocated by the communication network determining, on the basis of said comparing step, whether the level of the resources allocated by the communication network is lower than the level of requested resources, and outputting a result of said determining step, if it is determined, that a lower level is present.

Advantageous further developments of the present invention are as set out in the respective dependent claims.

According to the present invention, the proposed device and/or method enables to determine not only, whether the bearer service request was successful and the allocated bearer services and resources are accepted, but also if the bearer service parameters and resources allocated by the network to the communication connection are at a lower level than the bearer service parameters and resources requested by the user equipment for the communication connection. The information obtained by this comparison of the requested and allocated parameters and resources can be used by the network operator to evaluate if an upgrade of employed hardware is required. Additionally, the present invention is usable for reaching a more accurate knowledge about used system resources. This knowledge can be used for a further statistical analysis required for network planning, network management and the like. It is possible to maintain or plan an optimized network structure with all necessary recourses without the risk of waste money or manpower for implementing new resources which are actually not needed.

Preferred embodiments of the invention are described herein below in detail by way of example with reference to the accompanying drawings.

DESCRIPTION OF PREFERRED EMBODIMENTS

With reference to FIG. 1, a general overview of communication entities is shown which can be involved in a communication session between a user equipment UE1 and a user equipment UE2. The communication session relates to a speech call, a data call or the like. Here, a case is illustrated in which the user equipment UE1 being in a GSM public land mobile network (GSM PLMN) calls the second user equipment UE2 being in another terminating network. Said other terminating network can be the same GSM PLMN, another GSM PLMN, a network of a different type such as a public switched telephone network (PSTN), an integrated services digital network (ISDN), a circuit switched public data network (CSPDN) or the like. It is also possible, that one or more transit networks are involved in the communication session as relay networks from the network of the calling user equipment UE1 to the terminating network.

As mentioned above, for, e.g., establishing a communication connection, telecommunication services are required. With reference to FIG. 1, bearer services BS as part of said telecommunication services are introduced. The bearer services BS describe the capability of transmission of signals between users, independent of the form of content of said signals. Bearer services BS are characterized by a set of attributes. These attributes are classified into several categories such as information transfer attributes, access attributes, interworking attributes and the like. A bearer capability defines the technical features of a bearer service BS. A corresponding bearer capability information element BCIE comprises parameters defining the bearer service BS. Such an element is shown in FIG. 5.

Figure 5:
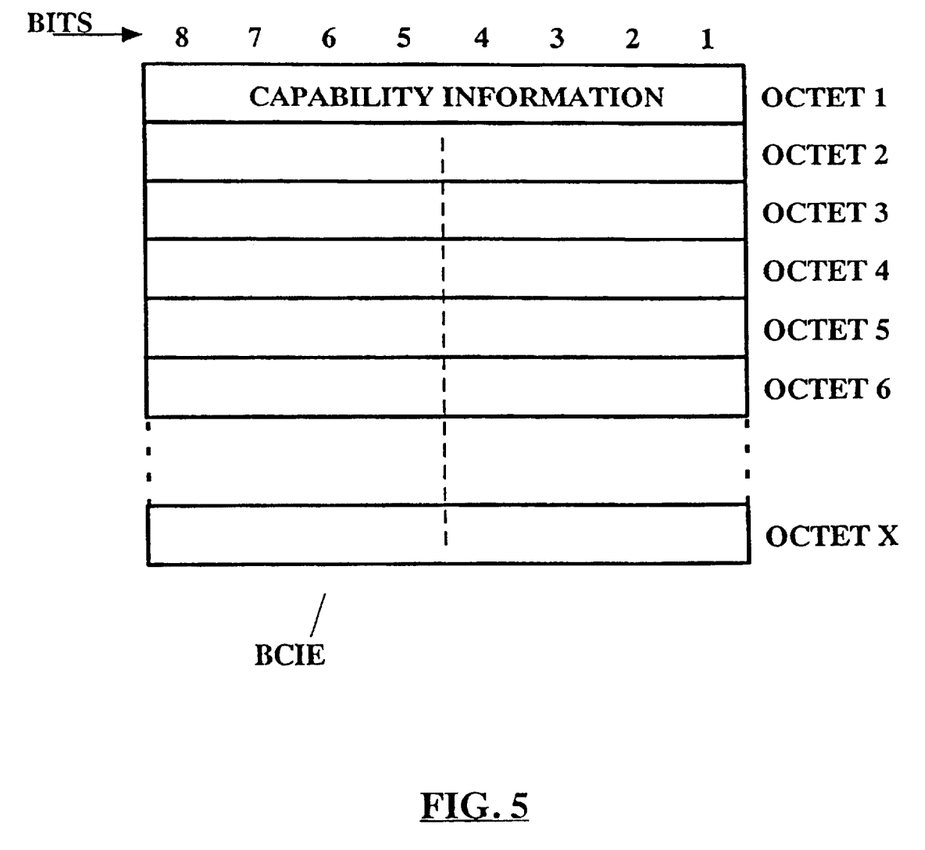
FIG. 5 is a diagram showing a structure of an information element including parameters used in the present invention.

As can be seen in FIG. 5, the bearer capability information element BCIE comprises several octets having 8 bits. The minimum length of one bearer capability information element BCIE for one bearer service BS is three octets, but this number can be increased according to the network capabilities provided by a network operator or according to features requested to be used by the user equipment.

Each octet 1 to X of the bearer capability information element BCIE contains different parameters containing the capability information, each of said parameters having a respective bit length. Such a parameter indicates, for example, a call type (speech or data or fax), a transfer mode, a data rate (e.g., a fixed network user rate FNUR or a air interface user rate AIUR), a number of channels used in the communication session, or the like.

During establishing or modifying a communication connection, for example, at least one bearer capability information element BCIE including requested bearer capabilities is sent from a user equipment to a network control part (e.g., the mobile services switching center MSC) to request bearer services BS. In turn, at least one bearer capability information element BCIE including allocated bearer capabilities is sent from the network control part to the requesting user equipment to allocate the corresponding bearer services BS. On basis of said information obtained by said BCIE, resources such as number of channels or channel coding to be used are recognized by the network control part. Therefore, corresponding resources are also allocated.

Figure 2:
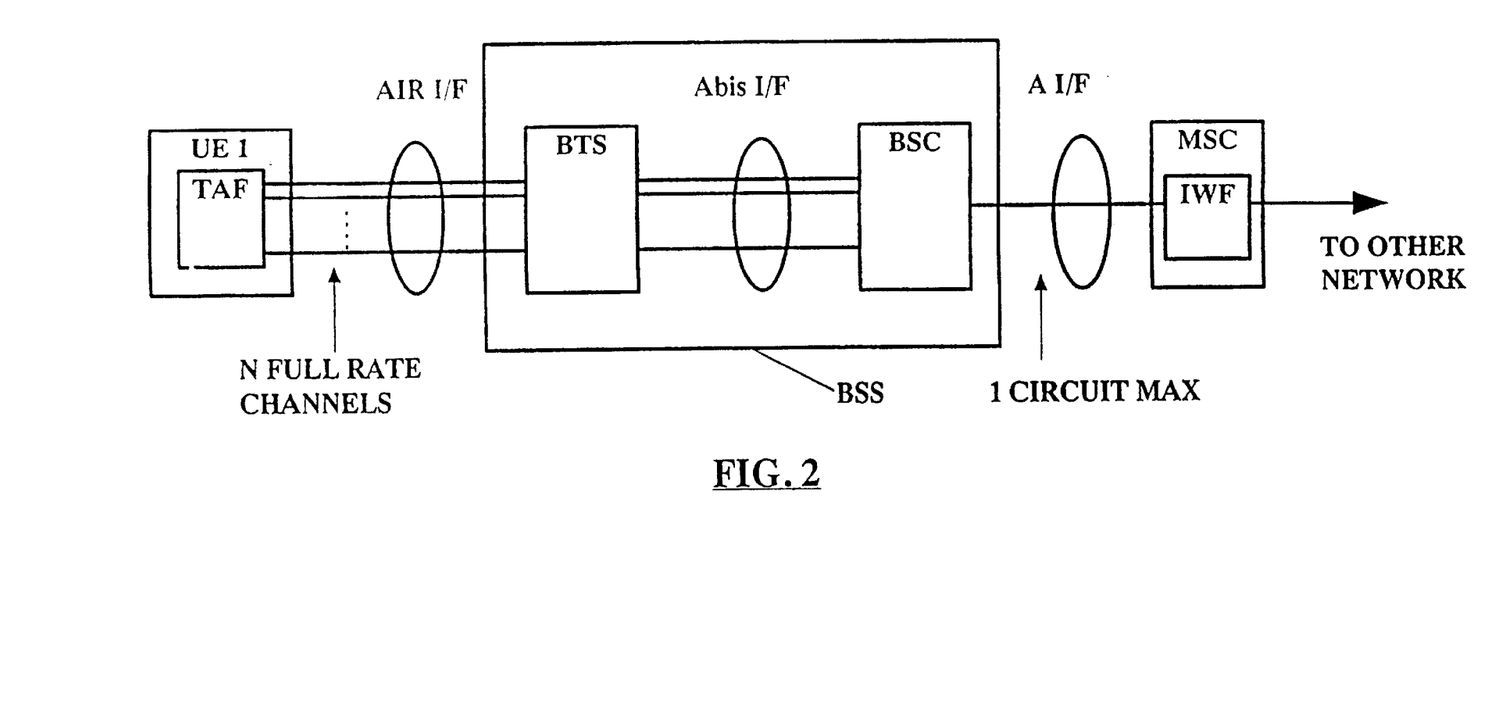
FIG. 2 is a block circuit diagram showing a part of the communication connection according to FIG. 1 for a data call.

With reference to FIG. 2 a part of the communication connection shown in FIG. 1 is described. In this case, a user equipment UE1 establish a data call with a GSM PLMN, in particular a high speed circuit switched data (HSCSD) communication. As is commonly known, such a GSM PLMN comprises a mobile services switching center MSC as network control device which is connected via an so called A-interface to a base station subsystem BSS. This base station subsystem BSS comprises at least one base station controller BSC which is connected via said A-interface with the mobile services switching center MSC and via an Abis-interface with at least one base transceiver station BTS which is also part of said base station subsystem. The base transceiver station BTS is connected via an air interface with the user equipment UE1.

As mentioned above, the communication connection described with reference to FIG. 2 is a HSCSD call. This means, that for increasing the transfer rate in comparison to an usual data call several traffic channels are used, for example, from the user equipment to the base station subsystem BSS for the call. Therefore, in the system, new features are required, e.g. a terminal adaption function TAF in the user equipment. This unit allows to split and combine the data into separate data streams which will then be transmitted via n full rate channels to the base station subsystem BSS in uplink direction or to the user equipment in downlink direction. In the base station controller, the data streams are combined to be transmitted via one line to the mobile switching center MSC. Therein, an interworking function IWF establish connection, for example, to other networks.

It is easy to understand, that for a data call, in particular for an HSCSD call, certain attributes of the bearer services BS and certain resources are required. For example, the used data transfer rate (e.g. 9600 bits per second), the channel coding and the number of used channels (1 to N) has to be defined. Therefore, in a case where the data call is originated by the user equipment UE1, corresponding parameters are requested by said user equipment UE1 via a bearer capability information element BCIE1 from the communication network, which is shown in FIG. 3.

Figure 3:
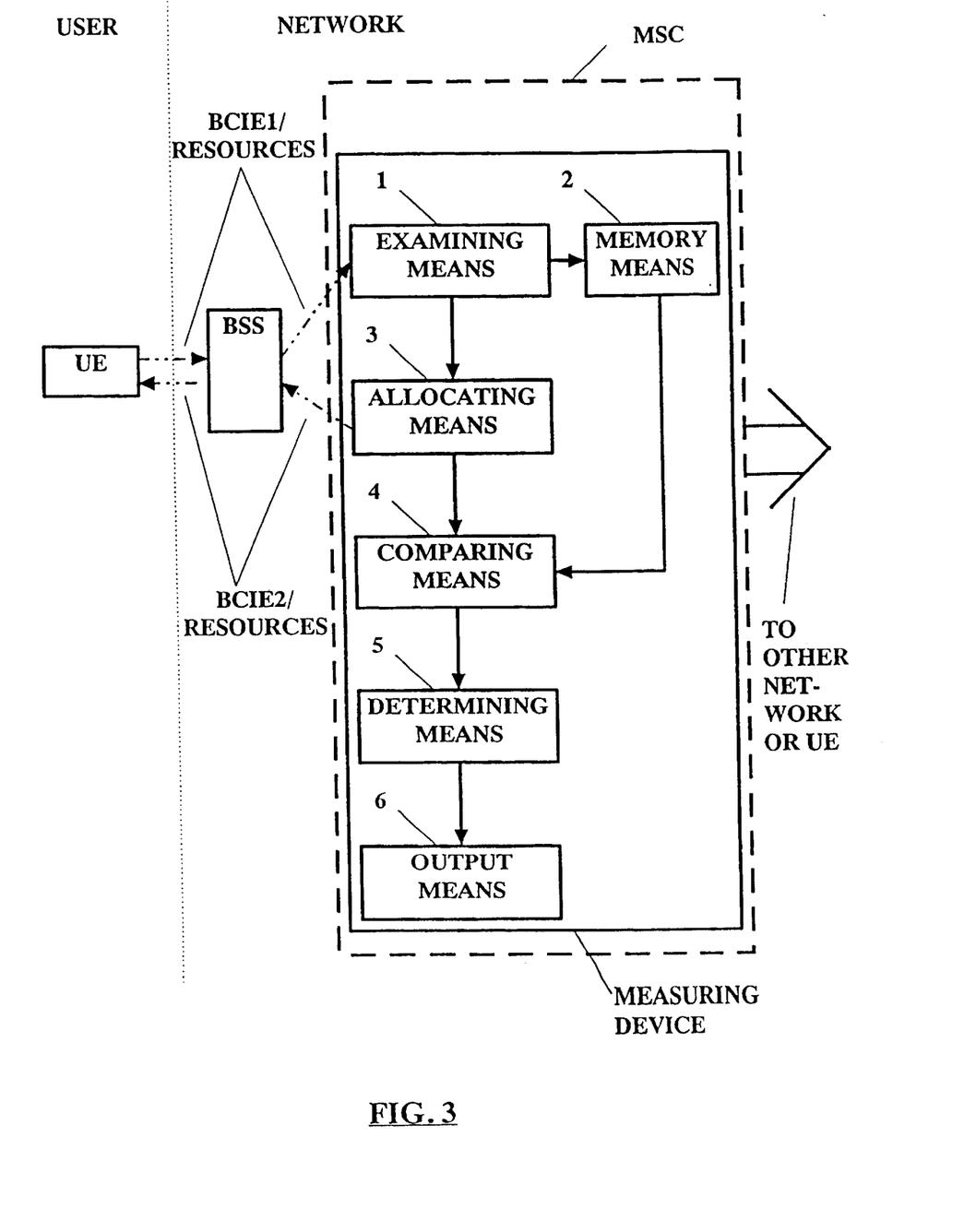
FIG. 3 is a block circuit diagram showing a measuring device according to the invention.

With reference to FIG. 3, parameters of the bearer services BCIE1 and resources are requested, for example, by the user equipment UE1. This request is checked, after a receipt, in the corresponding network control device, for example the mobile services switching center MSC, in an examining means 1. Here, the parameters of the BCIE1 are identified with reference to the corresponding bearer service attributes. The requested parameters are stored in a memory means 2 for further processing.

Then, on the basis of the examination by said examining means 1, bearer service attributes, which are available within the communication network, and corresponding resources are designated and allocated by an allocating means 3. Namely, only bearer service attributes and resources which are at an equal or at a lower level than the requested ones are allocated.

The designated bearer service attributes and resources are allocated to the communication connection and corresponding bearer service parameters BCIE2 are transmitted to the user equipment UE1, which in turn determines whether to accept these allocated bearer services and resources or not.

Now, the measurement of a difference in the requested and the allocated bearer service parameters and resources follows. Therefore, in a comparing means 4 the bearer service parameters BCIE1 requested by the user equipment UE1, which parameters are stored in the memory means 2, and the bearer service parameters BCIE2 allocated by the communication network (i.e. the MSC) as well as the corresponding resources are compared. For example, in a HSCSD call, in particular the requested data rate (e.g. the fixed network user rate FNUR and the air interface user rate AIUR) and the allocated (i.e. the actually used) data rate are compared. Also, the corresponding channel coding is checked. Additionally, the maximum number of channels requested and used is compared.

Subsequently, a determining means 5 determines, on the basis of the comparison result by said comparing means 4, whether said used (allocated) bearer service parameters BCIE2 of the communication network are at a lower level than the bearer service parameters BCIE1 requested by the user equipment UE1. A corresponding check is also made for the requested and allocated resources. For example, if the requested number of channels is four but only three can be used, this value is at a lower level and therefore the allocated bearer service BS and/or resources are at a lower level.

When said determining means 5 determines, that, e.g., the used bearer service is at a lower level than the requested bearer service, this is output by an output means 6. Said output means 6 is, for example, a counter, wherein the number indicated by said counter is increased by one each time a lower bearer service level is determined.

A method for performing such a measurement is now described with reference to FIG. 4.

When the user equipment UE1 calls for, e.g., transmitting data, for example by using the HSCSD technology, first a call setup has to be performed, thereby transmitting parameters of requested bearer services BCIE1 and requested resources to the corresponding communication network, e.g. a GSM PLMN (step S1). After receiving the requested bearer service parameters in step S2, they are examined in a examining step S3 to check which attributes are requested by the calling user equipment UE1. Also, corresponding resources required for that communication session are designated.

The examined bearer service parameters BCIE1 requested by the user equipment are stored in a storing step S4 for further processing. In a subsequent step S5 available bearer service parameters BCIE2 of the communication network are allocated, on the basis of the results in said examining step S3, to the communication connection. Also, resources such as a designated number of channels for that communication session are allocated (step S6).

In step S7, the respective bearer service parameters BCIE1 requested by the user equipment UE1 and stored in said storing step S4 and the respective bearer service parameters BCIE2 designated in said designating step S5, as well as the requested an allocated resources (step S6), are compared. In a subsequent step S8 it is determined, on the basis of the result of said comparing step S7, whether the level of the allocated parameters BCIE2 and resources is lower than the level of the requested parameters BCIE1 and resources. If NO, the measuring procedure is finished.

If the result in said determining step S8 indicates, that there is a difference between the requested and allocated bearer service and resources levels, i.e. bearer service parameters BCIE2 allocated by the communication network are at a lower level than the transmission service parameters BCIE1 requested by the user equipment UE1 or allocated resources are not sufficient, this is output in a step S9. For example, a counter is caused to increase indicating number by one.

Using the above described invention allows a network operator to decide, whether the available telecommunication services, in particular the available bearer services, of the communication network are sufficient to the services requested by users. Therefore, a necessary hardware upgrade can be evaluated in time.

Alternatively, as a second embodiment, it is also possible to determine not only, that the level of the bearer services and resources allocated to the communication connection is lower than the requested ones, but also to determine exactly, which allocated bearer service parameter and or resources is at a lower level than requested. For example, two values such as channel number and data transfer rate are at a lower level. After determination of said parameters, the corresponding results are forwarded to separate counters to be output separately. This separate determination can be included in the determination means 5 with reference to FIG. 3, or in a additional means. It is obvious that correspondingly separate output means 6 are to be introduced.

Figure 4:
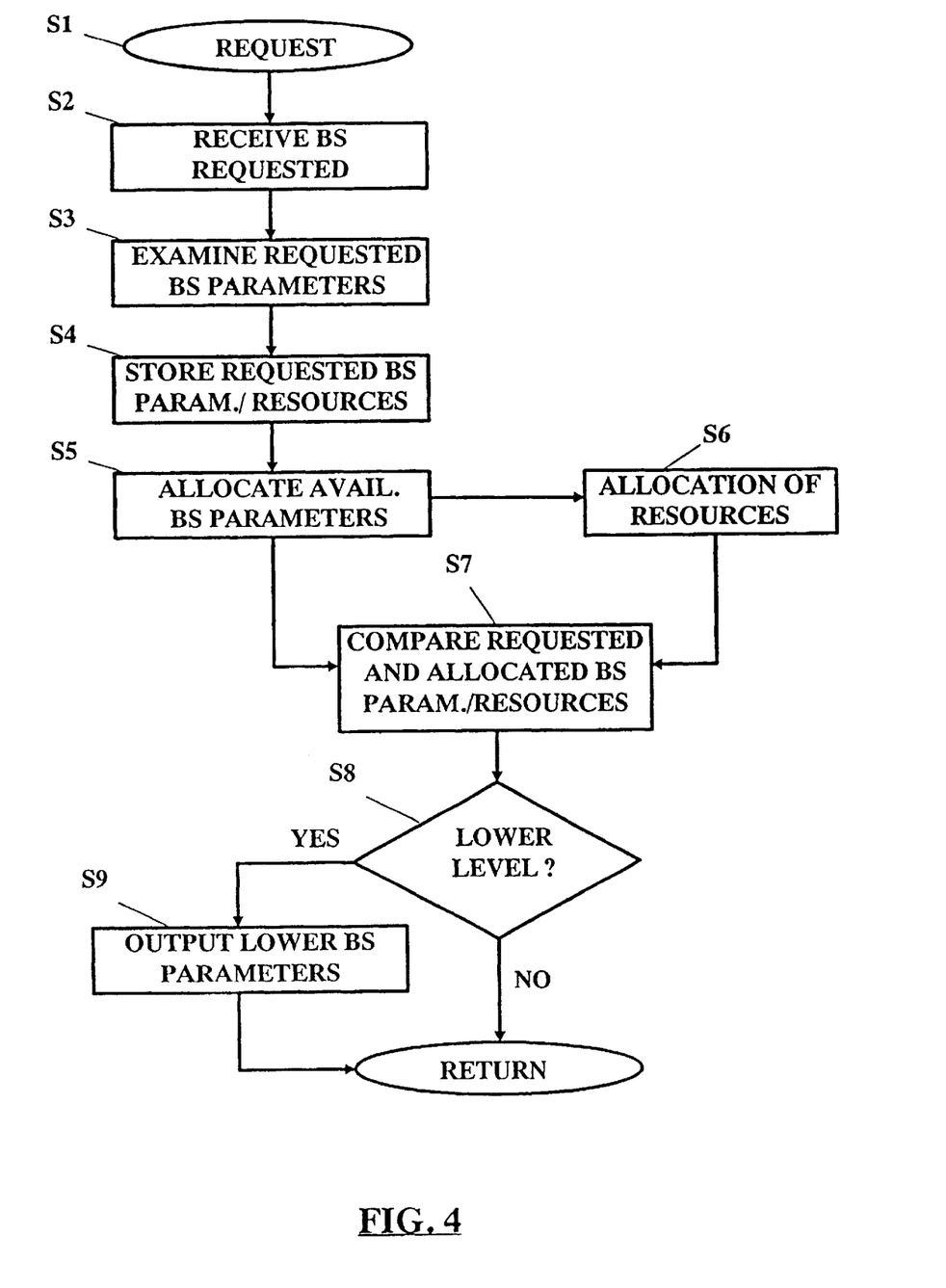
FIG. 4 is a flow chart showing a measurement procedure according to the invention.

Further, this exact determination of lower bearer services is then to be performed in the determining step S8 with reference to FIG. 4.

The usage of the second embodiment provides a more accurate determination of services or hardware resources, respectively, which require an upgrade. Additionally, a more accurate knowledge about used system resources can be obtained. This knowledge can be used for a further statistical analysis required for network planning, network management and the like.

The present invention is applicable to measure a level difference of telecommunication services and resources, in particular in bearer services, requested by a user equipment for a communication connection and allocated by the communication network to said communication connection. However, it is also applicable in the case, that the request for the telecommunication services is made by a communication network (internal in the same network or by another network, for example) to establish or modify a communication session. In such a case, the bearer capability information element BCIE submitted by the originating network has to be converted by the network control part MSC in a form which is understandable for the user equipment. For example, if the originating network is a ISDN network, it sends a ISDN BCIE. This ISDN BCIE is converted in, e.g., a GSM BCIE, which then is transmitted to the user equipment for checking and a further bearer service and resources request. That further request is then used for the measurement.

The present invention is also applicable in the case of a level up- and downgrading. Here, the user equipment UE wishes to upgrade (or downgrade) the bearer services and resources used for a current data communication session. For example, the number of currently used transfer channels is to be increased. A corresponding request includes also a bearer capability information element BCIE, which in turn can be used for a new measurement according to the present invention. The measuring method with reference to FIG. 4 starts again.

Additionally, the present invention is applicable when a handover occurs. In such a case, the communication connection of the user equipment is switched to another network part (for example another base station, base station subsystem BSS and or network control part MSC) due to a movement of the user equipment UE to a corresponding coverage area or due to a change in a signal quality. As the new network part eventually allocates bearer services or resources at a lower level, this has to be measured. In such a case, the comparing step S7 with reference to FIG. 4 and the subsequent steps are repeated for the new allocated parameters.

The present invention is preferably used in data calls using for example the high speed circuit switched data (HSCSD) technology. However, it is also applicable to any other type of call requiring telecommunication services.

In the present invention, a measuring device is proposed for measuring system resources which are used by a communication connection in a telecommunication network, said device comprising: means for receiving a request of allocation of system resources to establish said connection, said request indicating a preferred level of said resources, examining means 1 for examining parameters BCIE1 indicating said requested resources, allocating means 3 for allocating, on the basis of the examination by said examining means 1, available resources indicated by parameters BCIE2 of the communication network to the communication connection, and comparing means 4 for comparing the level of the requested resources BCIE2 and the level of the resources allocated by the communication network BCIE1. Furthermore, a corresponding measuring method is proposed. Using the present invention allows a operator to obtain improved knowledge of system resources.

It should be understood that the above description and accompanying figures are merely intended to illustrate the present invention by way of example only. The preferred embodiments of the present invention may thus vary within the scope of the attached claims.

What is claimed is:

1. A measuring device for measuring system resources which are used by a communication connection in a telecommunication network, said device comprising:
    means for receiving a request of allocation of system resources to establish said connection, said request indicating a preferred level of said resources,
    examining means (1) for examining parameters (BCIE1) indicating said requested resources, and
    allocating means (3) for allocating, on the basis of the examination by said examining means (1), available resources indicated by parameters (BCIE2) of the telecommunication network to the communication connection, characterized by
    comparing means (4) for comparing the level of the requested resources (BCIE1) and the level of the resources allocated by the telecommunication network (BCIE2),
    determining means (5) for determining, on the basis of the comparison by said comparing means (4), whether the level of the resources allocated by the telecommunication network (BCIE2) is lower than the level of requested resources (BCIE2), and
    outputting means (6) for outputting a result of the determination by said determining means (6), if it is determined, that a lower level is present.

2. A device according to claim 1, said device further comprising
    memory means (2) for storing information about said requested resources and parameters (BCIE1) for usage in the comparing means (4).

3. A device according to claim 1, wherein said measuring device is part of the control device (MSC).

4. A device according to claim 1, wherein the communication connection is used for data communication.

5. A device according to claim 4, wherein one to N channels are used for the communication connection between the user equipment (UE1) and the telecommunication network.

6. A device according to claim 1,
    wherein said parameters (BCIE1, BCIE2) indicating the level of the requested and allocated resources are configuring the communication connection of the user equipment (UE1) to the telecommunication network.

7. A device according to claim 6, wherein said resources are used for telecommunication services.

8. A device according to claim 7, wherein at least one of said telecommunication services is a bearer service, and the parameters of said service are included in a bearer capability information element (BCIE).

9. A device according to claim 1, wherein said determining means (5) is adapted to determine, which resources of a plurality of resources allocated are at a lower level than the resources of a plurality of resources requested.

10. A device according to claim 9, wherein the respective determination results corresponding to resources determined by said determining means (5) being at a lower level are forwarded to respective separate output means (6).

11. A device according to claim 1, wherein said output means (6) are respective counters.

12. A device according to claim 1, wherein said measuring device is adapted to determine, whether allocated resources are at a lower level than requested resources, for a first communication connection originated from the user equipment (UE1).

13. A device according to claim 1, wherein said measuring device is adapted to determine, whether allocated resources are at a lower level than requested resources, for a second communication connection originated from a telecommunication network, which second communication connection is terminated to the user equipment (UE1).

14. A device according to claim 1, wherein said measuring device is adapted to determine, whether allocated resources are at a lower level than requested resources for a communication connection after a request for upgrading or downgrading a service level.

15. A device according to claim 14, wherein said request is initiated by the user equipment (UE1).

16. A device according to claim 1, wherein said measuring device is adapted to compare new resources of the telecommunication network allocated due to a handover by said comparing means (4) with the originally requested resources.

17. A device according to claim 1, wherein said result of the determination is used to evaluate system resources and for a statistical analysis for network management.

18. A measuring method for measuring system resources which are used by a communication connection in a telecommunication network,
    said method comprising steps of:
        requesting (S1, S2) allocation of system resources to establish said connection, said request indicating a preferred level of said resources,
        examining (S3) parameters (BCIE1) indicating said requested resources, and
        allocating (S5, S6), on the basis of said examining step (S3), available resources indicated by parameters (BCIE2) of the communication network to the communication connection,
    characterized by further comprising the steps of
        comparing (S7) the level of the requested resources (BCIE1) and the level of the resources allocated by the communication network (BCIE2)
        determining (S8), on the basis of said comparing step (S7), whether the level of the resources allocated by the communication network (BCIE2) is lower than the level of requested resources (BCIE2), and
        outputting (S9) a result of said determining step (S8), if it is determined, that a lower level is present.

19. A method according to claim 18, said method further comprising a step of
    storing (S4) information about said requested resources and parameters (BCIE1) for the comparing step (S7).

20. A method according to claim 19, wherein said measuring method is performed in the control device (MSC).

21. A method according to claim 19, wherein the communication connection is used for data communication.

22. A method according to claim 21, wherein one to N channels are used for the communication connection between the user equipment (UE1) and the telecommunication network.

23. A method according to claim 18,
    wherein said parameters (BCIE1, BCIE2) indicating the level of the requested and allocated resources are configuring the communication connection of the user equipment (UE1) to the telecommunication network.

24. A method according to claim 23, wherein said resources are used for telecommunication services.

25. A method according to claim 24, wherein at least one of said telecommunication services is a bearer service, and the parameters of said service are included in a bearer capability information element (BCIE).

26. A method according to claim 18, wherein in said determining step (S8) it is determined, which resources of a plurality of resources allocated are at a lower level than the resources of a plurality of resources requested.

27. A method according to claim 26, wherein the respective determination results corresponding to resources determined in said determining step (S8) being at a lower level are forwarded to the output step (S9).

28. A method according to claim 27, wherein the respective results of said determining step (S8) are indicated in said output step (S9) by respective counters.

29. A method according to claim 28, wherein said measuring method is performed to determine (S8), whether allocated resources are at a lower level than requested resources, for a first communication connection originated from the user equipment (UE1).

30. A method according to claim 18, wherein said measuring method is performed to determine (S8), whether allocated resources are at a lower level than requested resources, for a second communication connection originated from a telecommunication network, which second communication connection is terminated to the user equipment (UE1).

31. A method according to claim 18, wherein said method is adapted to determine, whether allocated resources are at a lower level than requested resources for a communication connection after a request for upgrading or downgrading a service level.

32. A method according to claim 31, wherein said request is initiated by the user equipment (UE1).

33. A method according to claim 18, said method is performed after a handover.

34. A method according to claim 33, wherein new resources of the telecommunication network allocated due to said handover are compared in said comparing step (S7) with the originally requested resources.

35. A method according to claim 18, wherein said result of the determining step is used to evaluate system resources and for a statistical analysis for network management.

* * * * *

UNITED STATES PATENT AND TRADEMARK OFFICE
CERTIFICATE OF CORRECTION

PATENT NO. : 6,690,920 B2
DATED : February 10, 2004
INVENTOR(S) : Saarinen et al.

It is certified that error appears in the above-identified patent and that said Letters Patent is hereby corrected as shown below:

<u>Title page,</u>
Item [63], Related U.S. Application Data, should read:
-- Continuation of application No. PCT/EP99/03044, filed on May 4, 1999 --

Signed and Sealed this

Twenty-fifth Day of May, 2004

JON W. DUDAS
*Acting Director of the United States Patent and Trademark Office*